United States Patent [19]

Schneider et al.

[11] Patent Number: 5,873,543
[45] Date of Patent: Feb. 23, 1999

[54] WINDING HUB FOR INFORMATION CARRIERS IN TAPE FORM

[75] Inventors: Alfred Schneider, Hoenheim, France; Gottfried Lutz, Seefeld, Germany; August Liepold, München, Germany; Bernd Scholtysik, München, Germany; Hartmut Thiele, München, Germany

[73] Assignee: EMTEC Magnetics GmbH, Ludwigshafen, Germany

[21] Appl. No.: 765,669

[22] PCT Filed: Jun. 21, 1995

[86] PCT No.: PCT/EP95/02413

§ 371 Date: Jan. 6, 1997

§ 102(e) Date: Jan. 6, 1997

[87] PCT Pub. No.: WO96/01472

PCT Pub. Date: Jan. 18, 1996

[30] Foreign Application Priority Data

Jul. 4, 1994 [DE] Germany ............................ 9410713 U

[51] Int. Cl.⁶ ............................ B65H 75/10; B65H 75/18
[52] U.S. Cl. ...................... 242/613; 242/613.5; 242/611.2
[58] Field of Search .................................. 242/613, 613.4, 242/613.5, 611.2, 610.6, 118.2, 529, 571, 577.1

[56] References Cited

U.S. PATENT DOCUMENTS

| | | | |
|---|---|---|---|
| 3,632,053 | 1/1972 | Edwards et al. | 242/610.6 |
| 3,836,090 | 9/1974 | Mix | 242/613 |
| 4,176,804 | 12/1979 | Nemoto et al. | 242/613.4 |
| 4,923,137 | 5/1990 | Jorgensen et al. | 242/613 |
| 5,257,749 | 11/1993 | Liepold et al. | 242/613 |
| 5,520,353 | 5/1996 | Brandstetter et al. | 242/613 |

FOREIGN PATENT DOCUMENTS

94 00 220.7  4/1994  Germany .

*Primary Examiner*—John M. Jillions
*Attorney, Agent, or Firm*—Keil & Weinkauf

[57] ABSTRACT

A winding hub for tape information carriers is designed with spring elements between an inner ring and an outer ring for providing a compression ratio from the inner diameter to the outer diameter of less than 1:4. To increase the holding forces of the winding hub during reeling, the spring elements are assigned limiter elements.

13 Claims, 3 Drawing Sheets

WINDING HUB FOR INFORMATION CARRIERS IN TAPE FORM

BACKGROUND OF THE INVENTION

Winding hub for information carriers in strip or tape form, the width of the outer winding surface of the winding hub corresponding at least to the width of the information carrier, the winding hub comprising an outer ring and an inner ring, which are radially interconnected by elastically deformable spring elements running radially and in the circumferential direction, in order to prevent a relative movement of the outer ring with respect to the inner ring in the circumferential direction of the latter, and the winding hub having an inner and outer circumference with an inner and outer diameter, respectively, the winding hub having a compression ratio of the compressed inner diameter to the compressed outer diameter of less than 1:4 during winding up of the information carrier.

DE-U 9400220 discloses the winding hub described above with spring elements which lend the same a certain elasticity in the radial direction.

Such a winding hub is used for winding up magnetic tapes after cutting and the wound winding hub is supplied to cassette loading companies or cassette recording companies. These companies mount the winding hubs onto reeling machines, which engage in the individual winding hub by means of a take-up mechanism and clamp said hub from the inner circumference.

These take-up mechanisms have a limited clamping displacement. The inner ring of the winding hub is resiliently expanded by the mechanism and offers little resistance to this resilient expansion. As a result, the winding hub is not held with the necessary firmness on the mechanism and accidents can occur due to detaching and flying off of the tape roll and/or of the hub.

SUMMARY OF THE INVENTION

It is an object of the present invention to provide a winding hub of the type mentioned at the beginning which has adequately secure mounting.

We have found that this object is achieved by a winding hub for information carriers in strip or tape form, the width of the outer winding surface of the winding hub corresponding at least to the width of the information carrier, the winding hub comprising an outer ring and an inner ring which are radially interconnected by elastically deformable spring elements running radially and in the circumferential direction, in order to prevent a relative movement of the outer ring with respect to the inner ring in the circumferential direction of the latter, and the winding hub having an inner and outer circumference with an inner and outer diameter, respectively, the winding hub having a compression ratio of the compressed inner diameter to the compressed outer diameter of less than 1:4 during the winding up of the information carrier, which winding hub comprises limiter elements which are arranged in a centrally symmetrical manner and act substantially radially and in the case of an enlargement of the diameter (expansion) of the inner ring limit the latter.

In a first practical design, the effective spring length of at least some of the spring elements is reduced, to be more precise is shortened, by means of the limiter elements, which results in an increase in the transfer of force between inner ring and outer ring. The spring rigidity is increased and the "spring" becomes harder.

In a second practical configuration, in the event of a defined enlargement of the diameter (expansion) of the inner ring, a supporting of the inner ring on the outer ring is established by means of the limiter elements.

Both solutions provide the same result, namely a limitation of any enlargement of the diameter of the inner ring.

This achieves the effect that, by in each case a relatively simple modification, the operational reliability of the winding hubs is increased considerably.

In an advantageous design, the spring elements comprise substantially S-shaped webs with a circumferential part and radial parts at the ends.

The circumferential part of the S-shaped webs may expediently be arranged in the angular range of about 85° to about 95° relative to a radius of the winding hub.

In an advantageous development, the limiter element is designed as a limiter web which connects the circumferential part of the spring element, running in the circumferential direction, to the inner ring of the winding hub.

In a further development, a limiter stop provided on one of the inner or outer rings may be provided as the limiter element.

It is achieved by means of the webs or stops that, in the case of an enlargement of the diameter (expansion) of the inner ring of the winding hub, the displacement entailed by the enlargement of the diameter of the inner ring of the winding hub, the displacement entailed by the enlargement of the diameter is limited and, as a result, a minimum holding force on the hub take-up is ensured.

In a further development of the invention, the effective spring constant of the spring element can be set by different arrangement of the limiter web over the length of the circumferential part between the radial particles of said spring element.

As a result—apart from the intended displacement limitation—the spring rigidity of the spring elements of the winding hub can thus be generally set as desired.

A number divisible by 3 of spring elements and limiter elements is expedient.

The winding hub may favorably consist of thermoplastic material without any or at most with a small filler content.

The thickness of the limiter webs may correspond approximately to half the thickness of the spring elements.

In a specific design, each spring element may also be assigned a limiter element.

In a further design, at least 3 limiter elements designed as limiter stops may be provided.

BRIEF DESCRIPTION OF THE DRAWINGS

Embodiments of winding hubs according to the invention are described below and are represented in the drawing, in which:

In FIG. 3, a winding hub 5 is mounted on a mounting mechanism 6 of a reeling device, for example for the production of blank cassettes.

Figure 1:
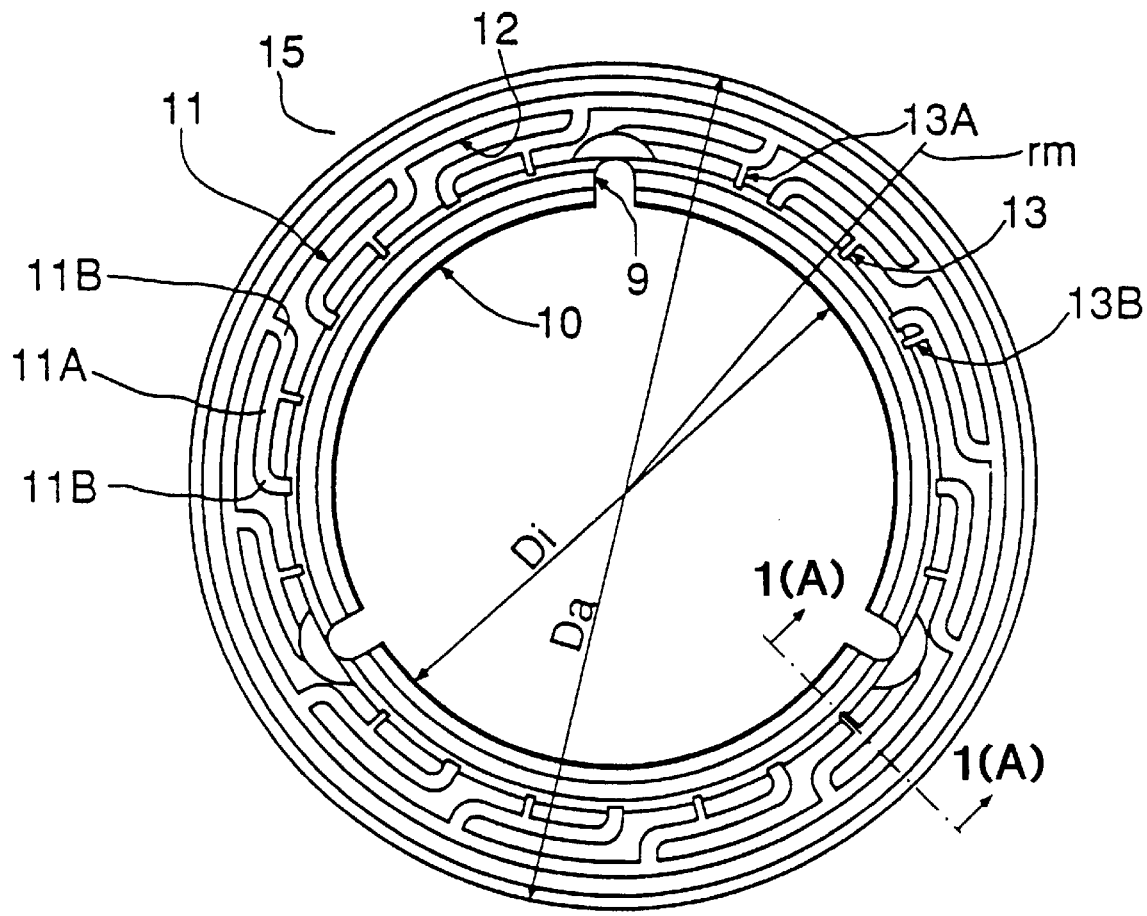
FIG. 1 shows a winding hub with limiter webs

The winding hub 5 is held by means of three lugs 7, which are moved with pressure radially outward, for example into the driving recesses 9 of the winding hub, by the tilting movement of a hinged clip 8. The three lugs may also bear against different points on the inner circumference.

7A denotes the position of the lugs in the position of rest.

The radial pressure of the mounting mechanism 6 causes the inner ring 10, which is connected to the outer ring 12 with "approximately S-shape" spring elements 11 in between, to be expanded circumferentially.

Without the measures according to the invention which are still to be described, under certain circumstances the holding force of the winding hub 5 may not be adequate during the mounting operation, since the inner ring yields, which may result in the winding hub 5 becoming detached at high rotational speeds.

FIG. 1 shows a winding hub 15 which differs from the winding hub 5 in that the likewise "approximately S-shape" spring elements 11, which comprise a longer circumferential part 11A and shorter "approximately radial parts" 11b, are connected via a limiter web 13 to the inner ring 10 of the winding hub 15. In FIG. 1, the limiter web 13 is about half as thick as the thickness of the spring elements 11 and is arranged likewise radially somewhat to the right of the center radius rm of the spring element (all the quadrants apart from the quadrant at the top right). In the quadrant at the top right there are represented three different arrangements of the limiter web 13, as 13A in the vicinity of the right-hand radial part and as 13B in the vicinity of the left-hand radial part, in order to show that the spring force can be varied from about 10% (13A) to about 90% (13B) by the choice of the arrangement of the limiter web. Consequently, if no limitation of the circumferential spring displacement is desired, the spring force of a winding hub can thus be suitably set with the form of the spring elements 11 unchanged without any difficulty.

Figure 1A:
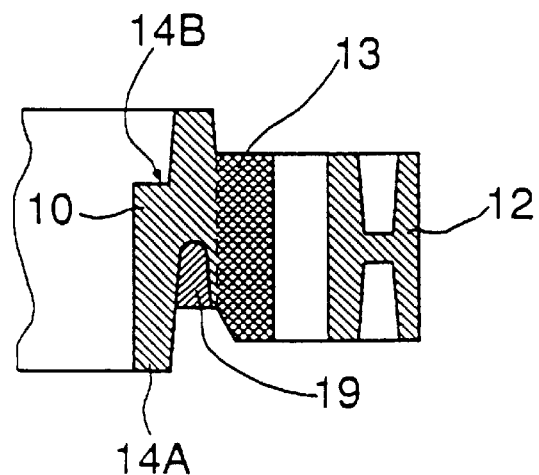
FIG. 1A shows a sectional representation of the winding hub according to FIG. 1, line of intersection A—A

In FIG. 1A, the winding hub is represented in cross section according to the line of intersection A—A in FIG. 1. The sectioned limitation web 13 can be seen cross-hatched. Reinforcing webs 19 may be provided on the inner ring 10, either on the radii on which the limitation webs 13 are arranged or else additionally on the radii on which the inwardly pointing radial parts 11b of the spring elements 11 lie.

It can be seen therein that the outer ring 12 has a double-T structure, which makes it possible to accomplish good strength along with low weight and using thermoplastic material without glass fibers or any other filler.

The inner ring 10 may, on the other hand, be of solid design and also, as shown, with projections and corresponding depressions 14A and 14B, respectively, for stacking a plurality of winding hubs 15 one on top of the other.

Figure 2:
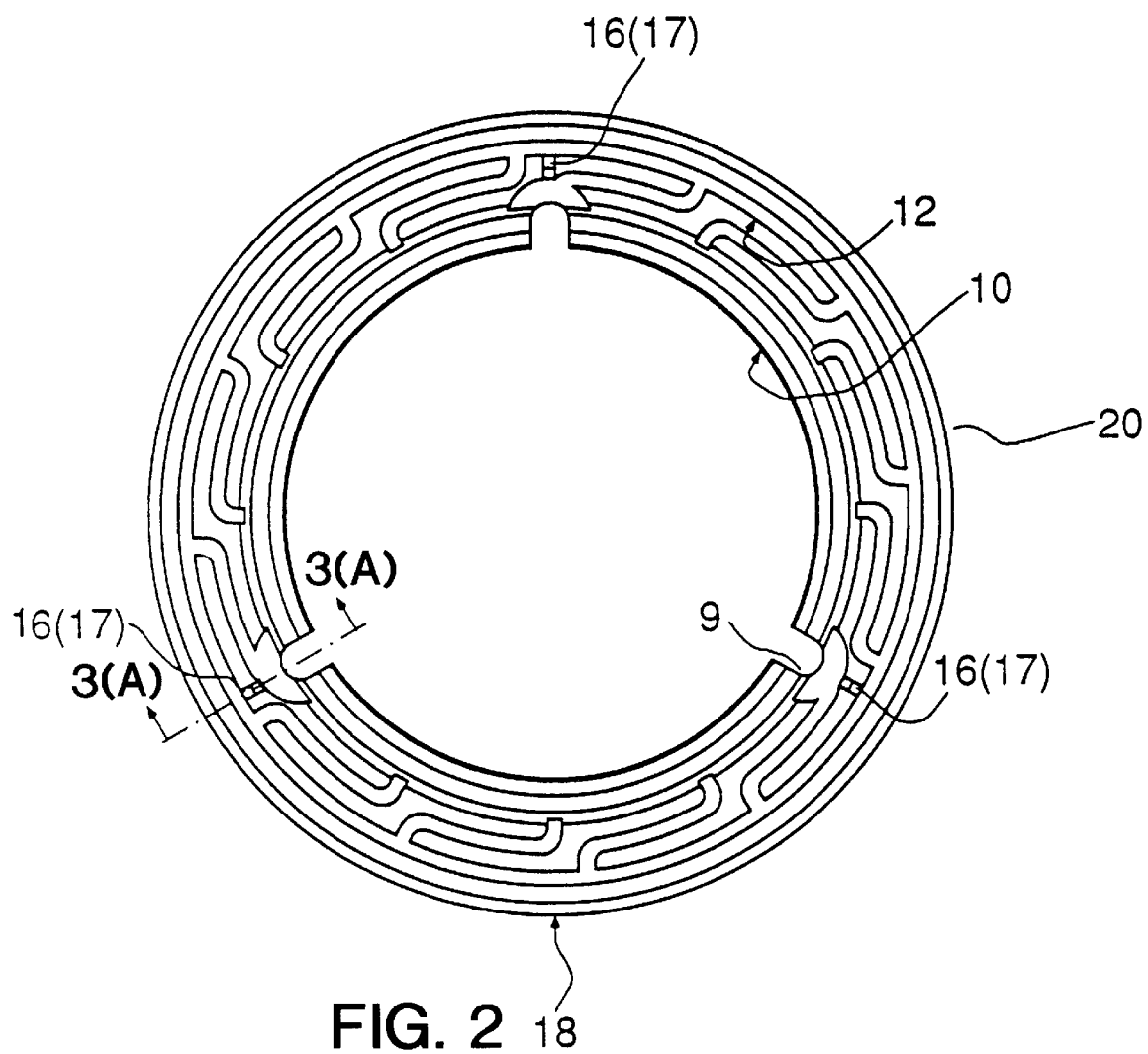
FIG. 2 shows a winding hub with limiter stops
Figure 3A:
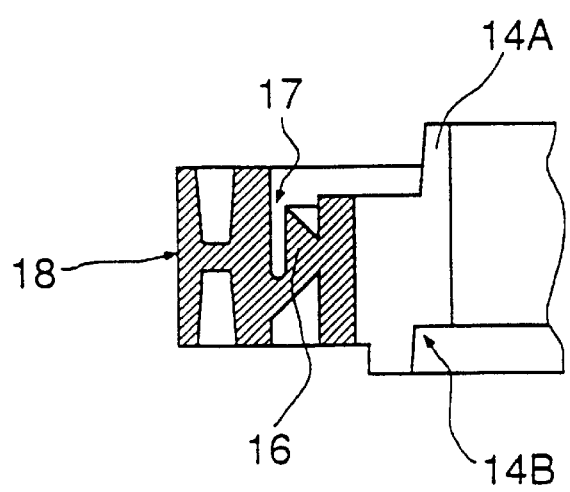
FIG. 3A shows a sectional representation of the winding hub according to FIG. 2, line of intersection B—B

FIG. 2 shows, as a variant according to the invention, a winding hub 20 which is designed with limiter stops 16, in each case arranged on the radii of the driving recesses 9. The limiter stops 16 are configured with a width a of about 2 mm and have a slit 17 (which can be seen in FIG. 3A) with a predetermined slit width b, which depends on the clamping displacements and tolerances of the mounting mechanisms on the market. In general, the slit width b may be about 0.2 to about 0.5 mm.

DESCRIPTION OF THE PREFERRED EMBODIMENTS

The winding hub configurations according to FIGS. 1 and 2 were tested with respect to their holding force on a mounting mechanism of the Tapematic company, Italy.

The winding hubs to be measured were mounted normally and connected to tensioning wires each offset 120°. The tensioning wires were connected to one another and a modified spring balance was attached at the connection point. The tensioning direction of the spring balance ran in the center axis of the winding hub away from the take-up mechanism.

In the case of a winding hub 15 according to FIG. 1 with a limiter stop 13 assigned to each spring element 11, a tensioning force of about 6 kp had to be applied until the winding hub was pulled off.

In the case of a winding hub 20 according to FIG. 2 with three limiter stops 16, with about b=0.2 mm slit width, a pulling-off force of about 5 kp was required.

Figure 3:
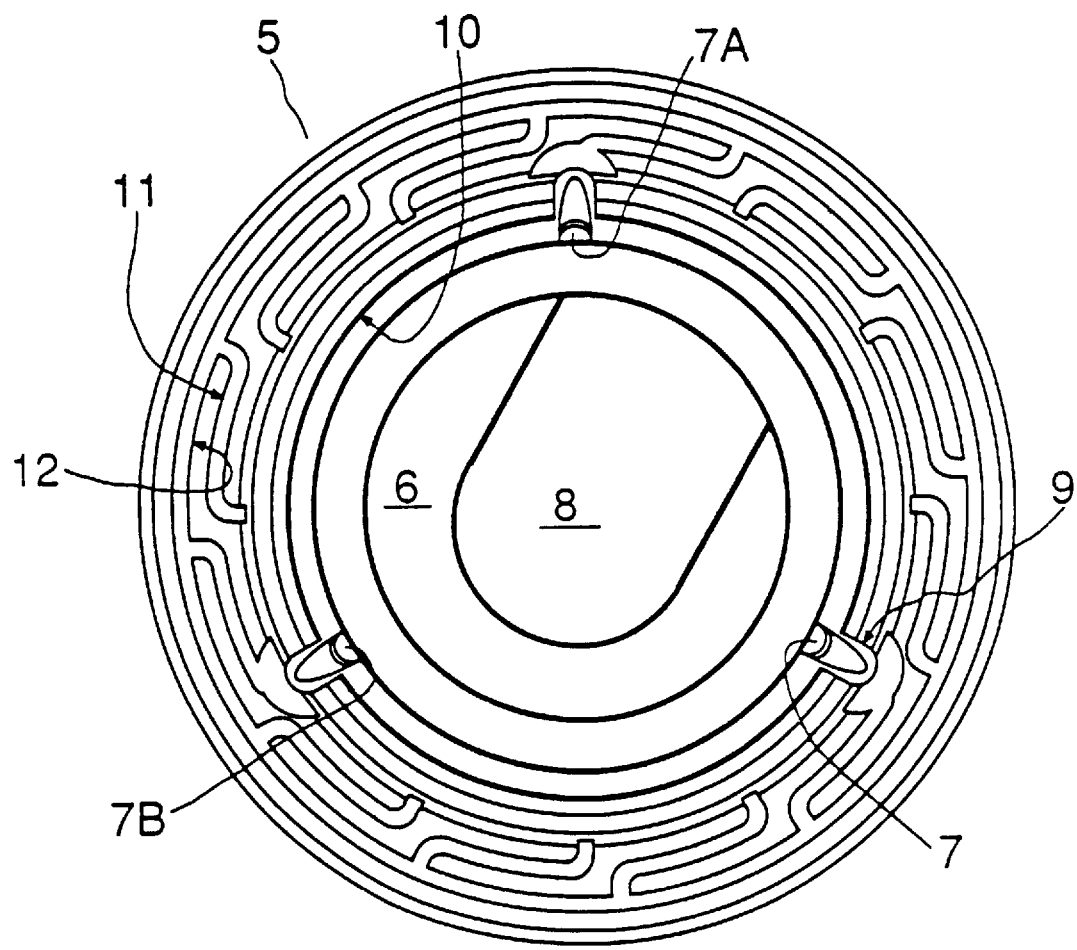
FIG. 3 shows a take-up mechanism with a winding hub.

In comparison with this, in the case of a winding hub 5 according to FIG. 3 without any limiter elements, a very low pulling-off force of about 4 kp was measured.

The thickness of the spring elements, which apart from the "approximately S-shape" of the elements 11 may also have other shapes, as described and represented in DE-U 9400220, should be at least about 0.6 mm, normal thickness about 1.0 mm, and should have a width which corresponds substantially to the width of the winding surface 18.

The circumferential parts 11A of the "approximately S-shape" spring elements may be arranged, for example, with respect to a radius of the winding hub in an angular range of about 85° to about 95°.

By optimization, the values of the pulling-off forces of the winding hubs 15 and 20 according to the invention can no doubt be further increased. In any event, it was possible in this way to establish a considerable increase in the pulling-off forces by about 50 and 25%, respectively, with respect to the comparison winding hub 5.

It is possible to use suitable web shapes together with suitable thermoplastic materials, which can be processed by the injection-molding process. Such thermoplastics must not contain any fillers such as glass fibers, glass beads and other reinforcing fillers.

For winding hubs according to the present invention, thermoplastics in general are suitable, in particular the thermoplastics listed below:

polystyrene, ABS (acrylonitrile/butadiene/styrene copolymers) mixture of polybutylene terephthalate with a polycarbonate.

PVC (polyvinyl chloride) polyamide.

During the winding of magnetic tape onto the winding hubs 5, 15 and 30, a compression ratio of $$\frac{\Delta Di}{\Delta DA}_{[sic]} \cdot \frac{1}{4} \quad \begin{array}{l} Di = \text{diameter of the inner ring} \\ Da = \text{diameter of the outer ring} \end{array}$$

has proven to be the maximum tolerable ratio, because this allows the winding hubs, once they have been wound, still to be pulled off the spindle on which the winding hub was provided with the roll of tape at very high winding speeds.

To simplify further the pulling off of the winding hubs with the rolls of tape located thereupon, a ratio of 1:5 is even much better.

The winding hubs 15 and 20 according to the invention, or similar configurations, additionally have the advantage that, when the magnetic tapes are unwound at the customer's premises, the winding hub cannot be unintentionally detached from the mounting and reeling mechanism and cause problems.

A winding hub for tape information carriers is designed with spring elements between inner ring and outer ring for providing a compression ratio from the inner diameter to the outer diameter of less than 1:4. To increase the holding forces of the winding hub during reeling, the spring elements are assigned limiter elements.

We claim:

1. A winding hub for information carriers in strip or tape form, the width of the outer winding surface of the winding hub corresponding at least to the width of the information carrier, the winding hub comprising an outer ring-and an inner ring, which are radially interconnected by elastically deformable spring elements running radially and in the circumferential direction which comprise substantially S-shaped weds with a circumferential part and radial parts at the ends, in order to prevent a relative movement of the outer ring with respect to the inner ring in the circumferential direction of the latter, and the winding hub having an inner and outer circumference with an inner and outer diameter, respectively, the winding hub having a compression ratio of the compressed inner diameter to the compressed outer diameter of less than 1:4 during winding up of the information carrier, which winding hub comprises limiter elements which are arranged in a centrally symmetrical manner and act substantially radially and the spring action of at least some of the spring elements is reduced by means of the limiter elements, so that in the case of a predetermined enlargement of the diameter of the inner ring a supporting of the inner ring with respect to the outer ring is established by means of the limiter elements and this enlargement of the diameter of the inner ring is limited thereby.

2. The winding hub as claimed in claim 1, wherein the spring elements comprise substantially S-shaped webs with a circumferential part and radial parts at the ends and wherein the spring constant of the spring element can be set by different arrangements of the limiter webs over the length of the circumferential part between the radial parts.

3. The winding hub as claimed in claim 2, wherein the circumferential part of the S-shaped webs is arranged in the angular range of about 85° to about 95° relative to a radius of the winding hub.

4. The winding hub as claimed in claim 1, which comprises a number divisible by 3 of spring elements.

5. The winding hub as claimed in claim 1, wherein the thickness of the limiter elements corresponds approximately to half the thickness (a) of the spring elements.

6. The winding hub as claimed in claim 1, wherein the number of spring elements and of limiter elements is divisible by 3.

7. The winding hub as claimed in claim 1, wherein each spring element is assigned at least one limiter element.

8. The winding hub as claimed in claim 1, wherein a number of spring elements which is divisible by 3 and at least three limiter elements designed as limiter stops are provided.

9. The winding hub as claimed in claim 1, wherein the inner ring is of a partially hollow design and is provided with reinforcing webs, the number of which approximates to the number of spring elements or is a multiple thereof.

10. The winding hub as claimed in claim 1, wherein each limiter element is designed as a limiter web which connects the circumferential part of the spring element, running in the circumferential direction, to the inner ring.

11. The winding hub as claimed in claim 1, wherein the limiter elements are designed as limiter stops which are provided on the inner ring and on the outer ring.

12. The winding hub as claimed in claim 1, wherein limiter webs are provided as first limiter elements, which in each case connect the circumferential part, running in the circumferential direction, of the spring element to the inner ring and wherein limiter stops are additionally provided as second limiter elements, which are provided on the inner ring and/or on the outer ring.

13. The winding hub as claimed in claim 1, wherein limiter stops are provided as limiter elements and a slit having a slit width of between about 0.15 and about 0.4 mm is provided between a limiter stop and the opposite winding hub part.

* * * * *